United States Patent
Botsolas, Jr. et al.

(10) Patent No.: US 10,071,508 B2
(45) Date of Patent: Sep. 11, 2018

(54) PREPARATION OF POLYMERIC ARCUATE SADDLES

(71) Applicant: Buckaroos, Inc., Indianapolis, IN (US)

(72) Inventors: Christos John Botsolas, Jr., Tampa, FL (US); Jeffrey J. Rebholz, Indianapolis, IN (US)

(73) Assignee: Buckaroos, Inc., Indianapolis, IN (US)

( * ) Notice: Subject to any disclaimer, the term of this patent is extended or adjusted under 35 U.S.C. 154(b) by 209 days.

(21) Appl. No.: 15/205,260

(22) Filed: Jul. 8, 2016

(65) Prior Publication Data
US 2017/0015021 A1  Jan. 19, 2017

Related U.S. Application Data

(60) Provisional application No. 62/192,890, filed on Jul. 15, 2015.

(51) Int. Cl.
| | |
|---|---|
| *B29C 33/38* | (2006.01) |
| *B29C 43/36* | (2006.01) |
| *B29L 31/24* | (2006.01) |
| *B29K 27/06* | (2006.01) |
| *B29C 33/30* | (2006.01) |

(52) U.S. Cl.
CPC ...... *B29C 33/3857* (2013.01); *B29C 43/3642* (2013.01); *B29C 33/30* (2013.01); *B29C 2043/3644* (2013.01); *B29K 2027/06* (2013.01); *B29K 2909/08* (2013.01); *B29L 2031/24* (2013.01)

(58) Field of Classification Search
None
See application file for complete search history.

(56) References Cited

U.S. PATENT DOCUMENTS

| | | | | | |
|---|---|---|---|---|---|
| 3,539,137 | A | * | 11/1970 | March | F16L 3/133 138/107 |
| 4,141,577 | A | * | 2/1979 | Beebe | F01N 13/1805 24/277 |
| 5,800,875 | A | * | 9/1998 | Hussong | B01D 39/2044 156/177 |
| 6,224,025 | B1 | * | 5/2001 | Alvarez | F16L 3/11 24/339 |
| 6,283,158 | B1 | * | 9/2001 | Botsolas | F16L 35/00 138/107 |
| 6,652,258 | B1 | * | 11/2003 | Starita | B29C 49/4823 425/195 |
| 7,422,714 | B1 | * | 9/2008 | Hood | B29C 33/40 264/219 |
| 7,677,505 | B2 | * | 3/2010 | Deichman | F16L 3/1008 138/106 |
| 8,763,960 | B1 | * | 7/2014 | Moore | F16L 3/14 174/40 R |
| 9,808,845 | B2 | * | 11/2017 | Rebholz | B21D 5/00 |
| 2011/0012287 | A1 | * | 1/2011 | Toledo | B29C 33/3842 264/226 |

* cited by examiner

*Primary Examiner* — Monica Huson
(74) *Attorney, Agent, or Firm* — Woodard, Emhardt, Moriarty, McNett & Henry LLP (57) ABSTRACT

Certain embodiments of the present invention relate to methods for the production of arcuate polymeric saddles typically used to anchor and suspend insulated or non-insulated pipes. Ribs may be included to provide strength. Rounded corners on the saddles facilitate comfortably introducing and placing the saddles into hangers as well as improving use.

20 Claims, 7 Drawing Sheets

PREPARATION OF POLYMERIC ARCUATE SADDLES

FIELD OF THE INVENTION

Aspects of the present invention relate generally to methods for preparing saddles for anchoring and supporting insulated and uninsulated pipes.

BACKGROUND OF THE INVENTION

Metal components which are commonly known as "saddles" are typically used in building construction to anchor and support pipes to suspend the pipes from the structure of the building. Saddles typically spread the force of a hanger across a portion of the pipe to minimize the force applied at a particular location.

Metal saddles are well known in the art, but are not suitable in all applications. If they are stored in inclement weather outdoors or indoors in an unfinished building, water or moisture could possibly cause rusting and corrosion. Steel saddles also typically have sharp edges and corners in many cases, causing minor cuts when handling or installing. Engineers will specify stainless steel saddles in food plants to avoid any chance of rust or metal droppings on the food processing equipment below. Stainless steel saddles are very expensive versus carbon steel saddles.

Metal saddles also are not well suited to certain applications. For example, it is important to be able to maintain very clean conditions in certain situations, such as food preparation and service facilities and other areas requiring a sanitary, e.g., bacteria free, environment. The present invention provides a solution to this need.

An improved saddle is desired.

SUMMARY

Certain embodiments of the present invention relate to arcuate saddles typically used to anchor and suspend insulated or non-insulated pipes. Certain embodiments of the present invention involve methods of manufacturing arcuate saddles. In one embodiment an arcuate saddle is formed for supporting a pipe where the saddle has a length and a width. The saddle defines two parallel length sides and two parallel width sides, wherein the width is formed into an arc defined by a radius. The length sides are substantially perpendicular to the width sides.

In certain embodiments, a method for forming an arcuate saddle for supporting pipe includes preparing a master mold, forming a reverse in two halves, and preparing a production mold from the reverse. The production mold is used to prepare saddles in a vacuum molding process.

Objects, features and advantages of the present invention shall become apparent from the detailed drawings and descriptions provided herein.

DESCRIPTION OF PREFERRED EMBODIMENTS

For the purposes of promoting an understanding of the principles of the disclosure, reference will now be made to the embodiments illustrated and specific language will be used to describe the same. It will nevertheless be understood that no limitation of the scope is thereby intended, such alterations, modifications, and further applications of the principles of the disclosure being contemplated as would normally occur to one skilled in the relevant art.

Figure 1:
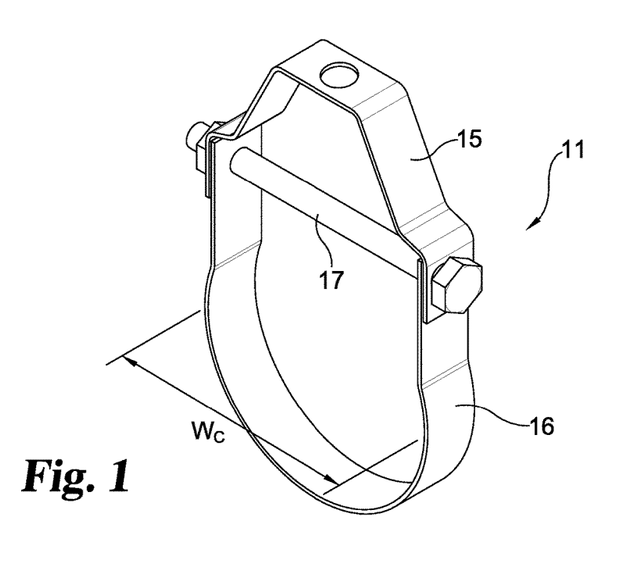
FIG. 1 is an example of a hanger assembly usable to suspend saddles according to embodiments of the present invention.
Figure 2:
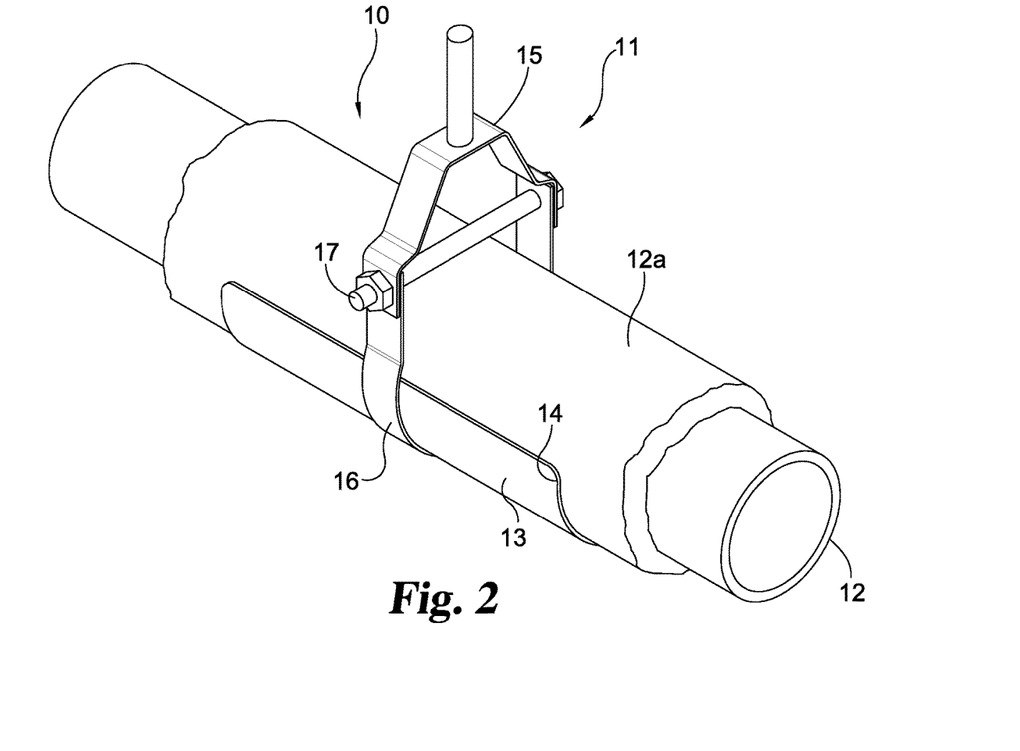
FIG. 2 illustrates a hanger assembly and saddle supporting a pipe according to a preferred embodiment of the present invention.

Embodiments of the present disclosure relate to arcuate saddles typically used to anchor and suspend insulated or non-insulated pipes. As illustrated in FIGS. 1 and 2, in a typical assembly 10 a hanger assembly 11 wraps around a pipe 12 or pipe insulation 12a with a saddle 13 situated between the lower portion of the hanger and the pipe. According to an embodiment of the present invention, saddle 13 includes rounded edge corners 14, typically four, to facilitate introduction of the saddle into the hanger and to eliminate or minimize the ability of sharp corners of the saddle to catch upon or scratch a user, the hanger, a pipe, insulation, a vapor barrier or other materials during introduction or use.

Hanger 11, for example the clevis hanger illustrated in detail in FIG. 1, typically includes an upper portion or bracket 15 which can be suspended from a building structure, and a lower bracket 16 for receiving and engaging the saddle and pipe. The hanger optionally includes a pivot 17 between the upper and lower brackets to allow some relative movement of the hanger portions which may result from vibration, expansion or contraction. Alternately, the hanger can be one piece or a strap which suspends a pipe and saddle.

When putting together assembly 10, an installer takes saddle 13 and slides it through lower bracket 16 of hanger 11 either independently or with the introduction of pipe 12 into the hanger. The vertical sides of saddle 13 have a width in a close tolerance with the interior of hanger lower bracket 16 to transfer suspension force from the pipe to the hanger once in place.

Figure 3:
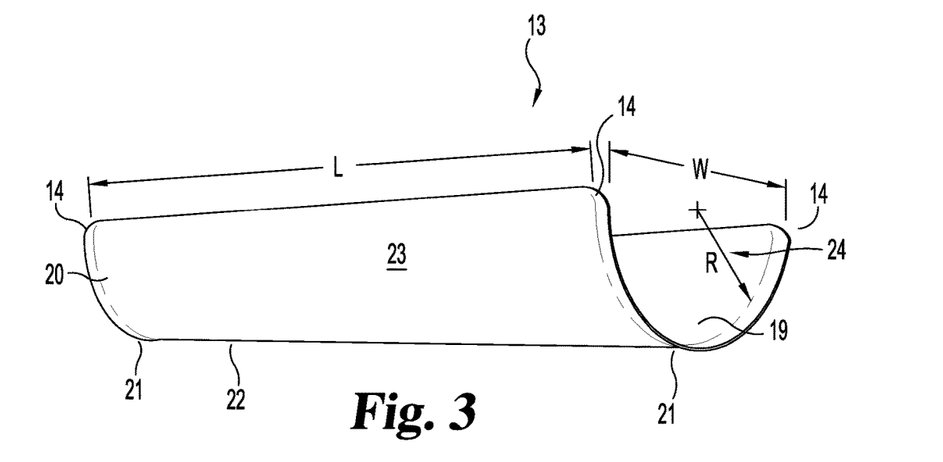
FIG. 3 is a perspective view of a saddle without ribs.
Figure 4:
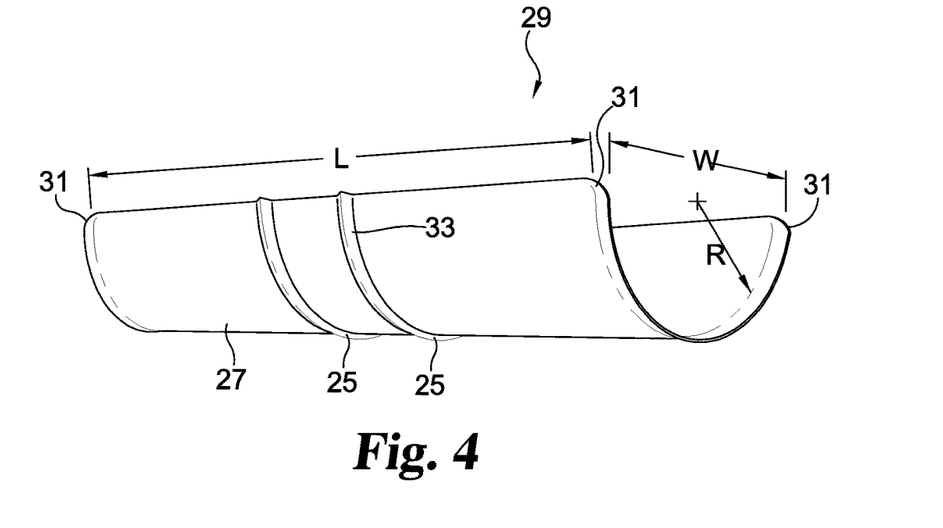
FIG. 4 is a perspective view of a saddle with 180 degree arcuate ribs.
Figure 5:
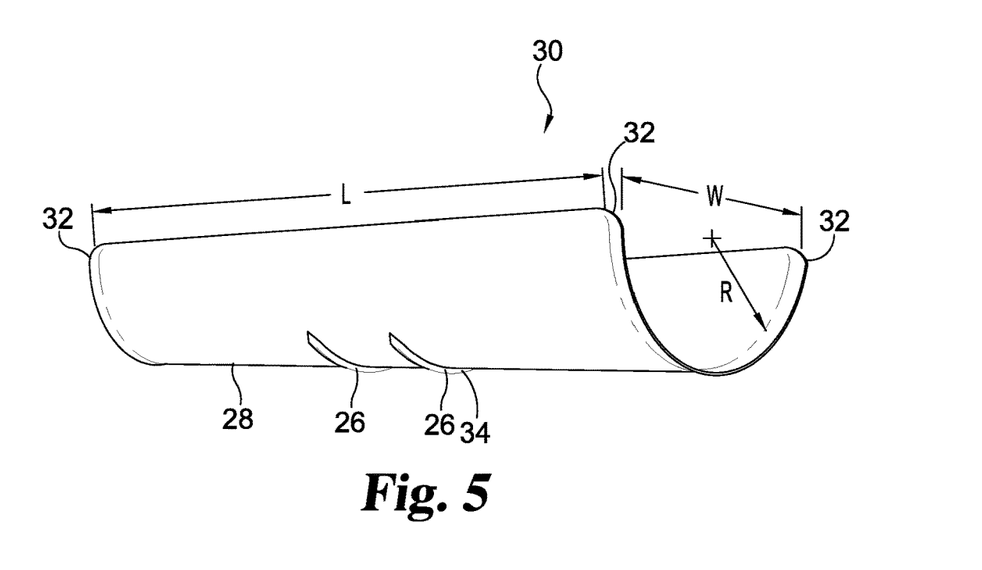
FIG. 5 is a perspective view of a saddle with partial ribs.

Certain embodiments include non-ribbed saddles, 180° ribbed saddles or partially ribbed saddles, each with rounded corners as illustrated in FIGS. 3-5. In 180° ribbed saddles or partial ribbed saddles, the ribs or partial ribs typically have a higher profile and larger radius than the interior of the hanger, particularly on the sides. When ribbed saddles are mounted in place in the hangers, the ribs preferably inhibit or minimize relative sliding movement of the saddle with respect to the hanger, which is received between the ribs.

FIG. 3 illustrates a non-ribbed saddle 13 with rounded corners 14 according to one preferred embodiment. Saddle 13 is formed typically with approximately a 180° arcuate bend about a radius R, forming a length L and a width W. Saddle 13 includes two ends 19 and 20 at opposing ends of the saddle length. Ends 19 and 20 optionally include a slight outwardly flared portion 21 to facilitate introduction of the pipe into the saddle and to minimize any abutment of sharp edges against the pipe or insulation. The exterior face of saddle 13 includes a generally lower portion or lower face 22 and opposing vertical sides 23. "Vertical" and "lower" references herein refer to arcuate or curved portions of the saddle which may include generally vertical or horizontal tangents and are not intended to imply planar or flat portions.

The outer diameter or width W of saddle 13 is preferably sized to closely correspond to the inner diameter or width $W_C$ (FIG. 1) of the lower bracket 16 of hanger 11 while the saddle inner diameter corresponds to the outer diameter of the pipe and/or insulation. As examples, pipe and/or insulation sizes may range from 0.5 to 24 inches. More typical saddle sizes have diameters of 1.5 to 12 inches, optionally available in half-inch increments, although other diameter sizes can be made as desired. Example lengths are 8 or 12 inches. In one embodiment tailored to the food industry, the saddles are provided in ½ inch incremental dimensions ranging from 2" to 6" as normally no piping in a food process plant is over 6" IPS.

An interior channel 24 extends through the interior of saddle 13 along a channel axis. In use, the interior diameter of channel 24 is sized to receive and engage an outer diameter of a corresponding pipe or pipe insulation.

In an option for certain embodiments, the saddle can be configured to adhere to the pipe or insulation surrounding the pipe to minimize relative movement of the saddle relative to the pipe or insulation. In one example of this, a double-sided adhesive strip may be mounted to the interior of the saddle longitudinally along interior channel 24. In one embodiment, the adhesive strip is pre-mounted in the saddles and includes a peel-away cover which is removed to expose an inward facing adhesive face just prior to installation. Alternatively, the adhesive strip may be pre-mounted in the saddles extending in a direction transverse to the longitudinal axis of the interior channel.

In yet another embodiment, one or more unmounted, two-sided strips with two peel-away covers are supplied with the saddle. In the two-sided version, a first face is first exposed and mounted either to the pipe assembly or the saddle. The second face is then exposed and adhered to the other of the saddle or pipe assembly when they are arranged respectively in a desired location. One or more adhesive strips may extend all or partially along the length and/or width of the saddle, and can be mounted between the interior lower portion of the saddle and a pipe assembly or along one or both side portions.

In the embodiments of FIGS. 4 and 5, 180° ribs 25 or partial ribs 26 are defined on the lower face 27 and 28 of saddles 29 and 30 with rounded corners 31 or 32, respectively. Ribs 25 and 26 typically have an arcuate bend corresponding in shape to the arcuate curve of lower faces 27 and 28. The ribs are generally transverse to the length L of saddle 29 or 30 and parallel to the width W. Ribs 25 and 26 preferably extend a sufficient height and width to inhibit saddle 29 or 30 from moving relative to the lower bracket 16 of hanger 11 once installed. When partial ribs are used, the partial ribs 26 are preferably primarily oriented on lower face 28 and do not substantially extend to the side portions. In certain preferred embodiments, the arcuate extent of the partial ribs 26 is approximately 60° or less.

Ribs 25 and 26 each include a central peak section 33 or 34 and opposing slanted or curved sides extending from face 27 or 28 to peak 33 or 34. Peak section 33 or 34 may be sharp, blunted or rounded. The ends of the partial ribs 26 may be sharply defined, but preferably are tapered into saddle 30 at each end to form a closed end. Ribs 25 or 26 could be mounted to lower face 22 with an attachment process, but preferably are formed into the saddles.

In certain preferred embodiments of the present invention, arcuate saddles are made with rounded corners. Non-limiting examples of corner radii which may be used are ¼", ⅜" or ½". Alternately a larger or smaller radius of curvature, or a non-constant radius may be used as desired. Preferably the rounded periphery at each corner is convex and smoothly tapers into the respective length and width edges of the saddle to eliminate sharp corners or discontinuities.

In accordance with the present invention, a method is provided for the preparation of a pipe saddle by vacuum forming. The method is useful for forming saddles of any material which is capable of being vacuum formed with strength properties allowing the produced saddles to function for the purpose of mounting pipes suspended from an overlying structure.

A preferred aspect of the present invention is the production of saddles from certain polymeric materials. By way of example, in a particular aspect, the present invention provides a method for vacuum forming saddles from polyvinyl chloride (PVC). The resulting saddles are especially advantageous in that they are capable of being cleaned with steam, and therefore are particularly useful to facilitate sanitary conditions such as required in the food service industry.

Figure 6:
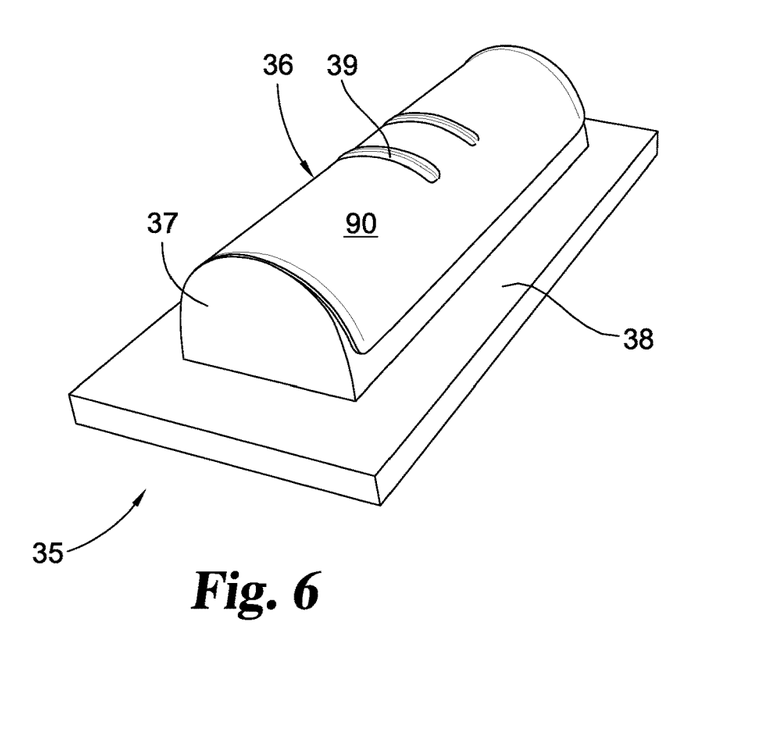
FIG. 6 is a perspective view of a master mold secured to a base.

The first step in the process is to prepare a master mold. The master mold will lead to preparation of a "reverse" which is in turn used to prepare the production mold used during the vacuum forming process. Referring to FIG. 6, there is shown a master mold 35 including a metal form 36 having an exposed, arcuate surface 90 and supported on wooden half-cylinder block 37. This is in turn secured to a flat, wooden base 38 which extends outwardly of the arcuate surface and end surfaces. The master mold thus comprises a solid form having an exposed, arcuate surface corresponding to the desired shape of the saddle and opposed end surfaces enclosing the ends of the arcuate surface, all of which is mounted on a base. In a preferred embodiment the arcuate surface has a semi-cylindrical shape.

Shown is a master mold for producing a saddle with a pair of partial ribs 39. It will be appreciated that the following discussion is equally useful for preparation of saddles with full ribs or no ribs, provided the initial master mold reflects these features.

From the master mold there is prepared a reverse, also known as a splash. The prepared saddles generally comprise a half-cylinder shape which has opposed inner and outer arcuate surfaces. In a preferred embodiment, the saddles are formed in a vacuum process which conforms a sheet of polymeric material against the outer surface of the production mold. The following embodiment therefore uses a master mold having an exposed surface corresponding to the outer surface of the produced saddles. It will be appreciated that the following discussion is equally applicable by instead using a master mold having an exposed surface which corresponds to the inner surface of the saddles, in which case the polymeric material will be vacuum formed against the inner surface of the production mold. Thus, the master mold may be configured with a convex exposed surface 90, or it may alternatively be configured with a concave exposed surface. The present description addresses the situation of a convex surface. It will be understood to a person of ordinary skill that the process applies equally with a concave surface with straightforward modifications to the described process being made.

The reverse is prepared in two stages with one half of the reverse prepared in each stage. In general, a planar divide 40 is placed adjacent to the exposed surface 90 along a line extending longitudinally of the form, the divide including a lengthwise planar surface 41 adjacent to and extending radially-outwardly of the arcuate surface 90 of the master mold 35, the divide further including planar end surfaces 44 adjacent to and extending longitudinally-outward from the end surfaces 45 of the master mold 35, the divide 40 thereby defining first exposed arcuate and end surface portions of the master mold. It will be appreciated that in the event the master mold has an exposed concave surface, the divide would then be received inside of the concavity and would extend radially inward of the curved surface.

Figure 7:
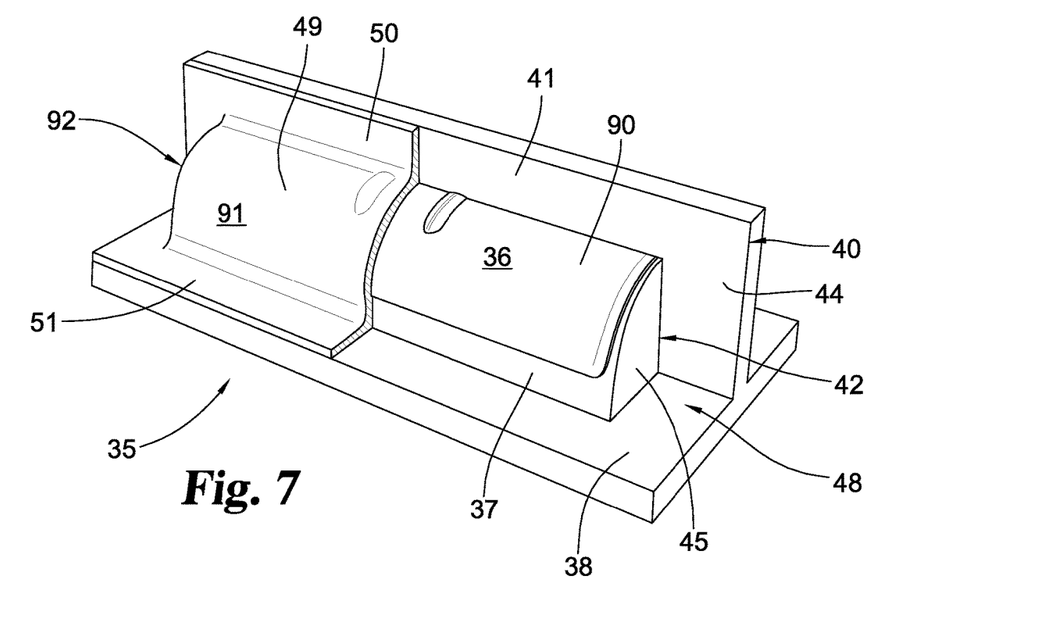
FIG. 7 is a perspective view of the master mold of FIG. 6 with a divide positioned thereon and partitioning off a first half of the master mold for preparation of a reverse.
Figure 8:
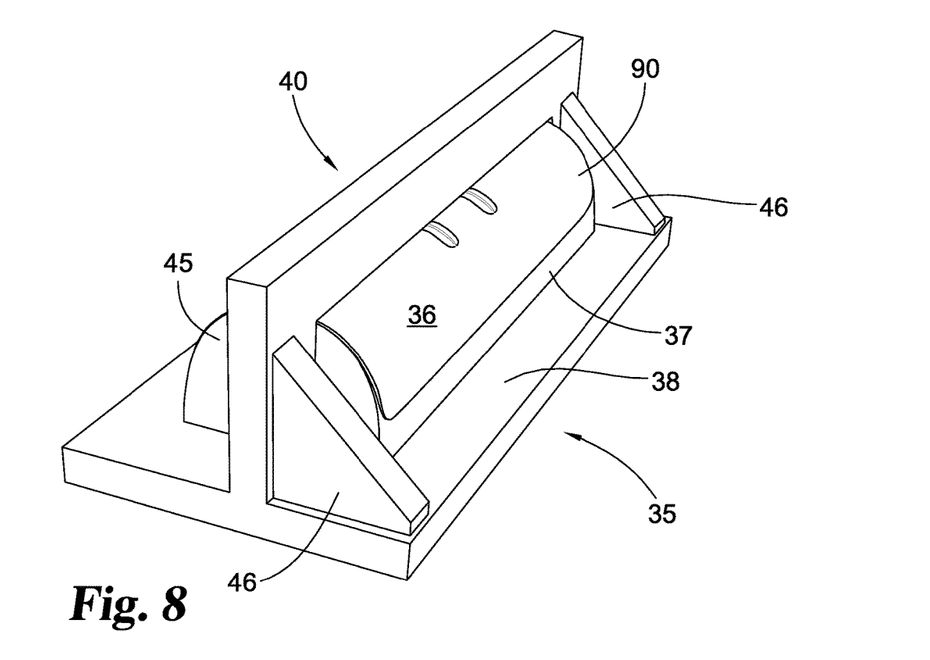
FIG. 8 is a perspective view of the master mold and divide of FIG. 7 viewed from the opposite side as in FIG. 7.

As shown in FIGS. 7 and 8, the divide 40 is positioned on the master mold 35 with a surface 41 extending vertically up from the master mold at the centerline between the lengthwise edges of the saddle of the master mold. The divide is thereby placed with the lengthwise planar surface positioned to expose one-half of the arcuate, e.g., semi-cylindrical, surface. The surface 41 also includes opposed end surfaces 44 which extend to the base 38 and extend along a vertical line 42 adjacent the centers of the end surfaces 45 of the block 37. The divide is secured to the base with braces 46.

This divide 40 thus presents a first half 48 of the master mold for use in preparing a corresponding half of the reverse. A rigid, first reverse member is then prepared on the exposed surface portions of the master mold and on the planar surfaces of the divide. A wax releasing agent is applied on this first half in several coats. Each wax application is treated with heat, such as by use of a torch directed on the coating, in order to seal in the wax layer. The inventors have found that the wax coating is sufficient when the coating shines. The wax coating should be sufficient to ensure that the reverse readily releases from the master mold once prepared.

A graphite gel coat is applied over the wax coating. In a preferred embodiment, the graphite gel is made by mixing A625 graphite to resin until it is a slurry consistency. Methyl ethyl ketone (M.E.K.) is used to activate the material. It is preferable to apply the gel evenly over the metal form and half cylinder block of the first half of the master mold, the surfaces 41 and 44 of the divide 40, and the upper surface of the supporting base 38 in a manner to provide few bumps or irregularities in the first half 49 of the resist. See FIG. 7. This allows for a subsequent fiberglass application that is smooth and even.

Over the cured graphite gel coat is applied a generous coating of resin to ensure that the surface is completely and well wetted with resin. While not required, an isophthalic polyester resin is preferred as it has a high heat deflection temperature rating and is well suited for long production runs and can withstand repeated heating and cooling. Fiberglass matting is then applied over the resin and activated at about 1%. About ¾ ounce fiberglass matting is suitable, and is brushed out and air rolled to ensure full wetting by the resin. Preferably the same resin used in the graphite gel coating is used in this fiberglass layup procedure. Smaller molds should be about ¼" thick with fiberglass, which sets up in ½-1 hour. Multiple layers of fiberglass and resin may be applied in successive steps. After each application it is best to wait a couple of hours because the setting process is exothermic.

The first reverse member is thereby provided. This first reverse member includes a partially-cylindrical portion 91 covering a portion of the cylindrical surface of the master mold, and a portion 92 covering each of the ends of the cylindrical surface of the master mold. In addition, the first reverse member includes a first planar support portion 50 covering the planar surfaces of the divide 40.

The divide 40 is then removed from the master mold 40. The presence of the initially-applied wax releasing agent on the divide facilitates removal of the divide 40 from the adjacent surfaces of the vertical portion 49 (FIG. 9) of the reverse. This leaves a first reverse member 49 comprising a structure which conforms to the outer surface of the first half 48 of the master mold, and particularly a mold portion corresponding to the metal form 36 and half cylinder block 37, a vertical portion 50 corresponding to the upstanding surface 41 of the divide, and a horizontal portion 51 corresponding to the upper surface of the base.

This process is then repeated for preparing the other half of the reverse, i.e., a second, rigid reverse member. The vertical portion 50 of the first half 49 of the reverse serves as the divide for making the second reverse member. Thus, referring to FIG. 9, with the divide removed the process continues by applying the wax releasing agent to the remaining exposed portions of the master mold and base, namely, upper surface 52 of base 38, second half 53 of metal form 36, second half end surfaces 54 of block 37, and facing surface 55 of vertical portion 50 of the first half of the reverse. As earlier described, this is in turn followed by the application of a graphite gel coat, and one or more successive layers of resin and fiberglass matting.

Figure 9:
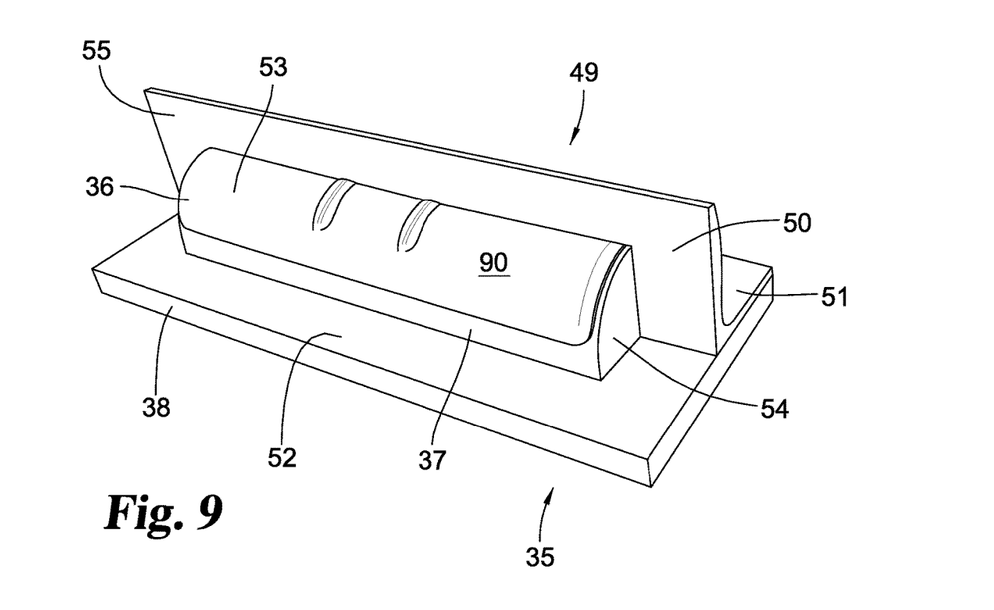
FIG. 9 is a perspective view of the master mold of FIG. 7 with the divide removed and showing the first half of the reverse.

The second reverse member 56 is thereby provided. The second reverse member comprises a partially-cylindrical portion 94 covering the remaining exposed arcuate surface of the master mold, and a portion 95 covering each of the remaining ends of the arcuate surface of the master mold. The second reverse member also includes a second planar support portion 58 covering the first planar support portion.

Figure 10:
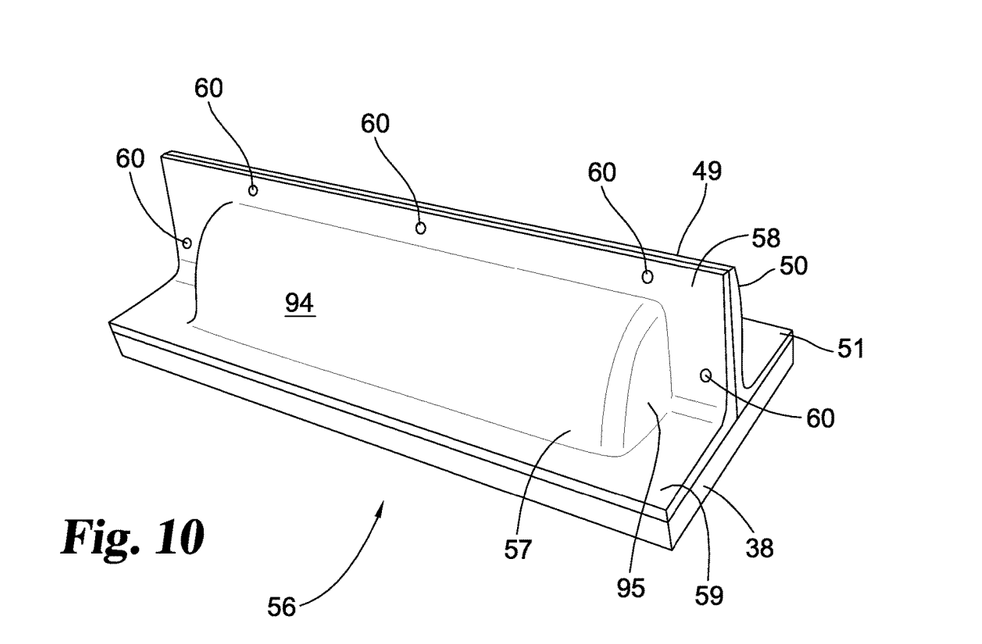
FIG. 10 is a perspective view of the completed reverse with holes drilled for attaching together the two halves of the reverse.

The result, shown in FIG. 10, is a second half 56 of the reverse, which in this embodiment is a mirror image of the first half 49 of the reverse. Second reverse half 56 thus similarly comprises a mold portion 57 corresponding to the metal form and half cylinder block, a vertical portion 58 facing the vertical portion 50 of the first reverse half 49, and a horizontal portion 59 coplanar with the horizontal portion 51 of the first reverse half.

The two reverse halves will subsequently be separated, but first they are provided with alignment features to facilitate reassembling the reverse members. These alignment features may be of any manner known to those skilled in the art. For example, the alignment features may comprise a number of holes 60 which are drilled through the adjacent, vertical portions 50 and 58 of the first and second reverse members 49 and 56, respectively. This will allow for reassembly of the two reverse halves once they have been separated from the base 38.

The two mold halves are next separated by prying apart the vertical portions 50 and 58. The master mold is thereby removed from the first and second reverse members. With the presence of the wax releasing agent positioned between the two reverse halves and between each reverse half and the corresponding portions of the base, the reverse halves can be readily separated from each other and from the base. Each reverse half 49 and 56 is then cleaned and smoothed in order to be reassembled together to form the production mold. For example, the surfaces of the reverse halves may be sanded, e.g., with #220 grit sand paper, to smooth the surfaces and remove scratches.

Figure 11:
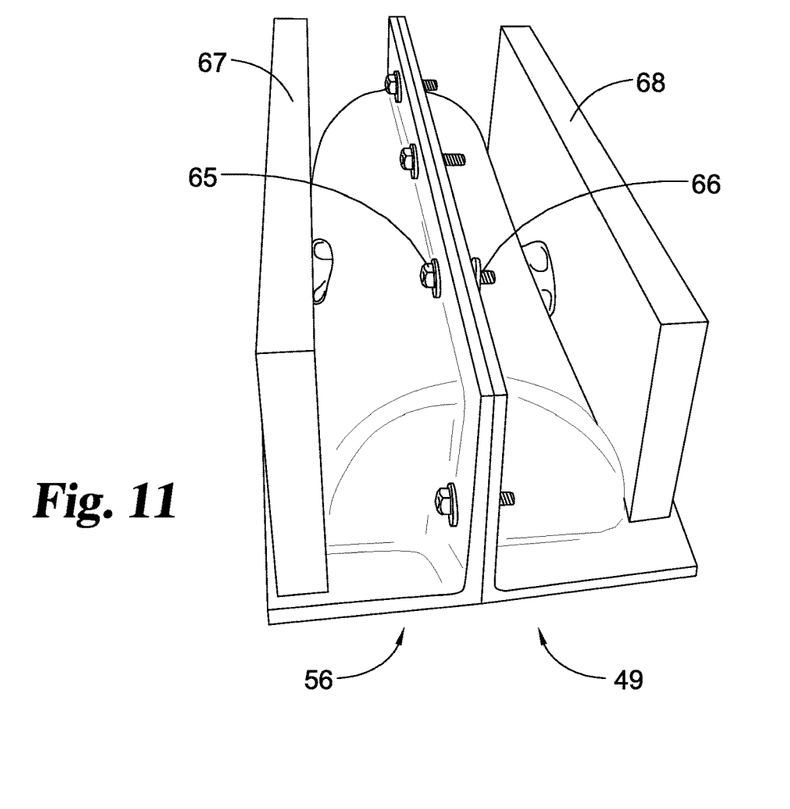
FIG. 11 is a perspective view of the completed reverse attached together with bolts.

With the two reverse halves separated, a wax coating is applied. As before, the wax is applied to all relevant surfaces with one coat usually being enough, although multiple coats may optionally be applied. Each wax coating is burned off with a blow torch for 30 seconds to burn off gases. The two halves are then bolted back together evenly, using a plurality of bolts 65 and nuts 66 as shown in FIG. 11. Supports 67 and 68 are secured to the respective halves of the reverse to facilitate further preparation of the reverse in the following steps.

The assembled reverse with the wax coating is then used to prepare the production mold. The interior 69 of the reverse is first treated with an application of polyvinyl alcohol (PVA) to act as a release barrier. This coating is allowed to dry, typically for about 5-10 minutes. A resin gel coat is then applied, which is preferably catalyzed at about 1%. This gel coat is allowed to dry for 30-45 minutes. A skin coat is then applied over the gel coat. The skin coat comprises successive layers of resin and fiberglass matting, e.g., ¾" matting. The fiberglass mat is applied and brushed in with resin, and then rolled to remove air. Seven to eight layers are preferably applied. See FIG. 12.

Figure 12:
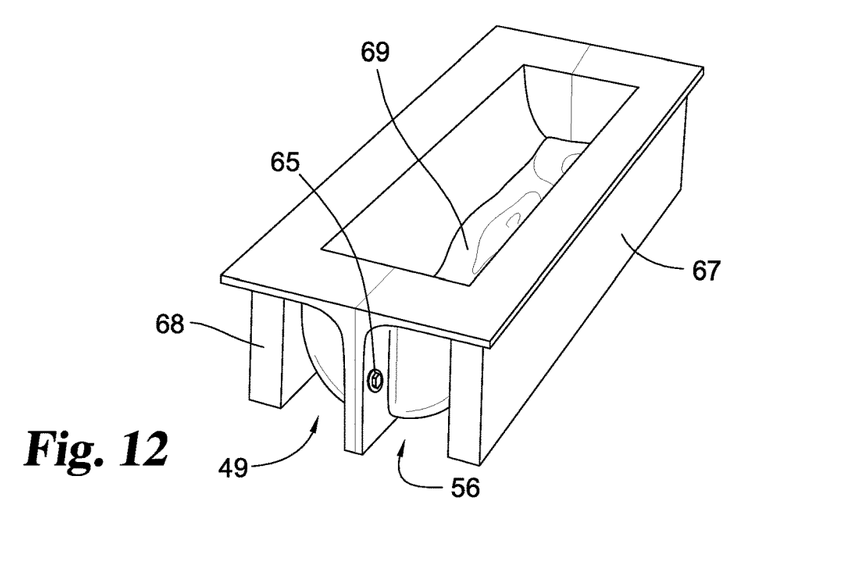
FIG. 12 is a perspective view of the reverse showing the applied fiberglass matting of the production mold.

Once the skin coating has sufficiently cured, the skin coating is packed with ceramic beads that have been coated with epoxy to bind them together. This packing is cured and assists in keeping the shape of the production mold from distorting. The packed production mold is then removed from the reverse by loosening or removal of the bolts 65 and nuts 66. The packing at the two ends of the production mold is then drilled and the holes are filled with solid graphite in order to provide a good seat for securement of the production mold during the vacuum forming processes. The production mold is then ready for use.

Figure 13:
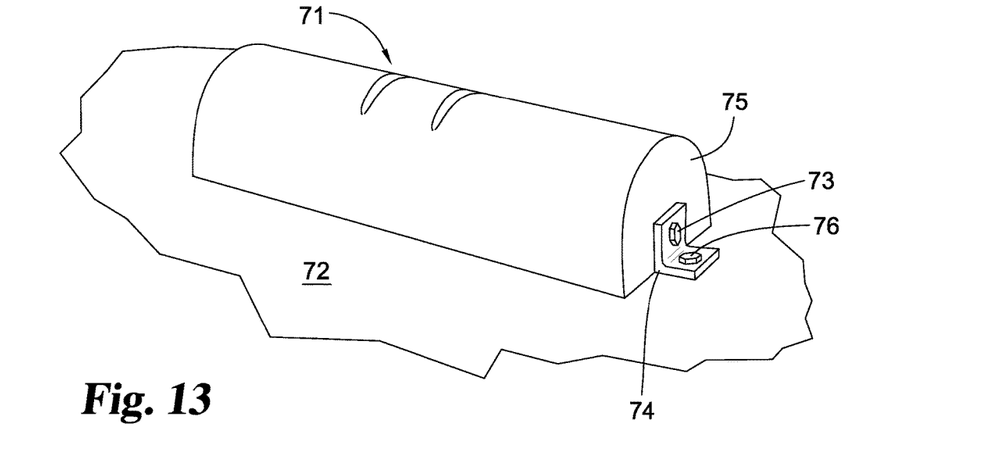
FIG. 13 is a perspective view of a production mold secured to a vacuum table.
Figure 14:
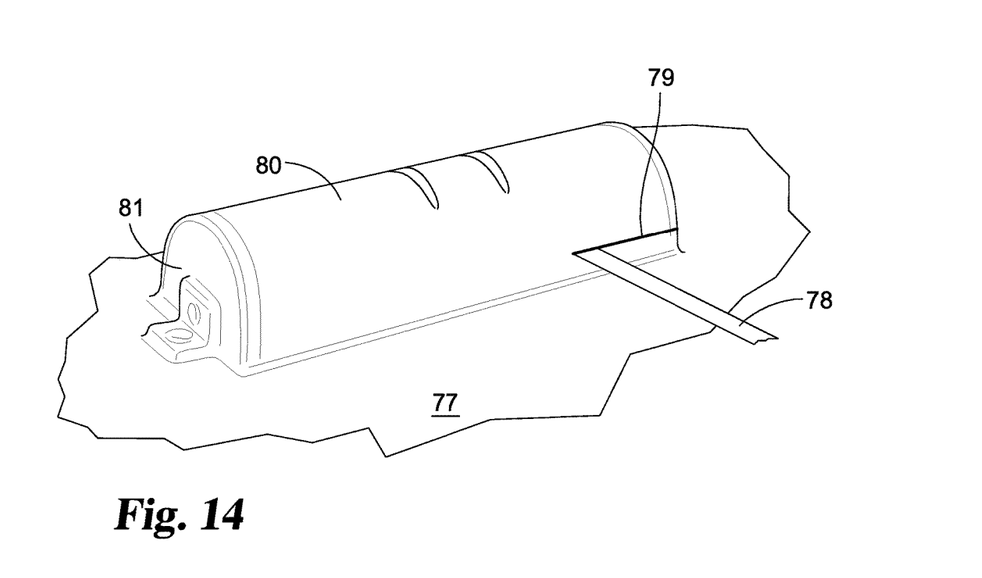
FIG. 14 is a perspective view showing a sheet material that has been vacuum formed over the production mold (now removed), and particularly showing a cutting of the saddle formation from the sheet.

The production mold 71 is placed on the vacuum forming table 72 and is secured with screws 73 inserted through brackets 74 and into the solid graphite at the ends 75 of the mold. The brackets are then secured to the table with screws 76. A moldable sheet 77 (FIG. 14) is then placed over the mold table and caused to be formed by being pulled against the production mold by a vacuum. This formed sheet is then removed from the table and a band saw 78 is used to make an initial cut 79 to separate the saddle formation 80 from the rest of the sheet and to form the lengthwise edges of the saddle, as shown in FIG. 14. The end walls 81 of the saddle formation 80 are then removed to form the ends of the final saddle. Finally, the corners of the saddle may optionally be punched or otherwise trimmed to form a smooth, curved surface.

As noted, this vacuum forming process may be used with a variety of moldable materials, particularly polymeric materials. In a preferred embodiment, the foregoing process is used to form PVC saddles. As another example, Exod®, a modified CPVC, can be used and will withstand steam and scalding water wash downs, along with maximum chemical use, for outdoor or indoor use. In practice, the PVC or other formed saddles are dimensioned to provide the desired strength for a given application. Varying lengths, diameters and thicknesses of materials are within the scope of the present invention. In a test at a food plant, PVC saddles formed in accordance with the described process worked well with no indication of cracking or other problems.

The saddles of the present invention can provide numerous advantages over conventional steel saddles. For example, PVC saddles, typically at 50-60 mil thickness, are much lighter than carbon steel saddles (22-16 gauge) typically used on jobs. Because of this, they are much easier to transport to a job site and the shipping charges are much less because freight charges are based on weight. PVC saddles are much more sanitary for food plants, pharmaceutical plants, hospitals, medical facilities and clean room areas. PVC saddles are easy to clean with a damp cloth, and they can withstand scalding wash downs without any problems.

PVC saddles are available in all of the popular colors and do not have to be painted, saving additional manufacturing dollars. In one embodiment, the PVC saddles are provided in an orange color to indicate ammonia refrigeration piping. Moreover, if a PVC saddle falls out of the clevis or strut hanger system, it is much less likely to injure a person.

In another aspect of the invention, the PVC saddles are preferably provided with sealing of the saddles to the adjacent pipes or insulation in order to increase cleanliness. When food plants, for example, do their steam wash downs, hot water can collect inside the saddles and sit there for days, causing mildew type issues. With the relatively flexible PVC saddles, the installer can put a bead of PVC Weld Adhesive along the horizontal and circumferential edges to insure that water will not move inside during wash downs. This is a great benefit to situations where high sanitary conditions are important, as in the food industry. It will be appreciated that the materials identified for use in the above process are exemplary, and that equivalent materials may also be used without diverging from the present invention. Thus, for example, a variety of release agents, resin systems, etc. are known by those skilled in the art and are therefore within the scope of the present invention. For example, the polymer or polymer blend, as well as associated resins, waxes, lubricants, smoke suppressants and other materials and/or additives, may include a variety of components suitable to end use conditions, and it is within the skill in the art to select appropriate materials for these purposes. As a specific example, typical resins include Asbury Graphite A625 grade resin and Arpol ISO Resir 724lt-15.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method of preparing a production mold for producing vacuum-formed pipe saddles, comprising:
    forming a master mold comprising a solid form having an exposed, arcuate surface corresponding to the desired shape of the saddle and opposed end surfaces enclosing the ends of the arcuate surface;
    placing a planar divide adjacent to the exposed surface along a line extending longitudinally of the form, the divide including a lengthwise planar surface adjacent to and extending radially of the arcuate surface of the master mold, the divide further including planar end surfaces adjacent, to and extending longitudinally-outward from the end surfaces of the master mold, the divide thereby defining first exposed arcuate and end surface portions of the master mold;

forming a rigid, first reverse member on the first exposed surface portions of the master mold and on the planar surfaces of the divide, the first reverse member including
a partially-cylindrical portion covering a portion of the cylindrical surface of the master mold,
a portion covering each of the ends of the cylindrical surface of the master mold, and
a first planar support portion covering the planar surfaces of the divide;
removing the divide from the master mold;
forming a rigid, second reverse member on the remaining exposed surface portion of the master mold and on adjacent surfaces of the first divide portion, the second reverse portion including
a partially-cylindrical portion covering the remaining exposed arcuate surface of the master mold,
a portion covering each of the remaining ends of the arcuate surface of the master mold, and
a second planar support portion covering the first planar support portion;
removing the master mold from the first and second reverse members; and
preparing the production mold using the first and second reverse members.

2. The method of claim 1 in which the arcuate surface is a semi-cylindrical surface.

3. The method of claim 2 in which the divide is placed with the lengthwise planar surface positioned to expose one-half of the semi-cylindrical surface.

4. The method of claim 1 in which the master mold further comprises a base, the solid form being attached to the base and the base extending outwardly of the arcuate surface and end surfaces of the solid form.

5. The method of claim 1 in which said removing the master mold comprises separating the first and second reverse members; and further includes reassembling the first and second reverse members prior to preparing the production mold.

6. The method of claim 5 and which includes providing alignment features on the first and second reverse members prior to separating the first and second reverse portions.

7. The method, of claim 6 in which the alignment features comprise a plurality of aligned holes formed in the first and second reverse members.

8. The method of claim 7 in which said reassembling comprises extending fasteners through the plurality of aligned holes in the first and second reverse members.

9. A method of preparing a vacuum-formed pipe saddle, comprising:
forming a master mold comprising a solid form having an exposed, arcuate surface corresponding to the desired shape of the saddle and opposed end surfaces enclosing the ends of the arcuate surface;
placing a planar divide adjacent to the exposed surface along a line extending longitudinally of the form, the divide including a lengthwise planar surface adjacent to and extending radially of the arcuate surface of the master mold, the divide further including planar end surfaces adjacent to and extending longitudinally-outward from the end surfaces of the master mold, the divide thereby defining first exposed arcuate and end surface portions of the master mold;

forming a rigid, first reverse member on the first exposed surface portions of the master mold and on the planar surfaces of the divide, the first reverse member including
a partially-cylindrical portion covering a portion of the cylindrical surface of the master mold,
a portion covering each of the ends of the cylindrical surface of the master mold, and
a first planar support portion, covering the planar surfaces of the divide;
removing the divide from the master mold;
forming a rigid, second reverse member on the remaining exposed surface portion of the master mold and on adjacent surfaces of the first divide portion, the second reverse portion including
a partially-cylindrical portion covering the remaining exposed arcuate surface of the master mold,
a portion covering each of the remaining ends of the arcuate surface of the master mold, and
a second planar support portion covering the first planar support portion;
removing the master mold from the first and second reverse members;
preparing a production mold using the first and second reverse members; and
vacuum-forming a pipe saddle using the production mold.

10. The method of claim 9 in which the arcuate surface is a semi-cylindrical surface.

11. The method of claim 10 in which the divide is placed with the lengthwise planar surface positioned to expose one-half of the semi-cylindrical surface.

12. The method of claim 9 in which the master mold further comprises a base, the solid form being attached to the base and the base extending outwardly of the arcuate surface and end surfaces of the solid form.

13. The method, of claim 9 in which said removing the master mold comprises separating the first and second reverse members; and further includes reassembling the first and second reverse members prior to preparing the production mold.

14. The method of claim 13 and which includes providing alignment features on the first and second reverse members prior to separating the first and second reverse portions.

15. The method of claim 14 in which said providing alignment features comprises drilling holes through adjacent portions of the first and second reverse members.

16. The method of claim 15 in which said reassembling comprises extending fasteners through the plurality of aligned holes in the first and second reverse members.

17. The method of claim 9 in which the pipe saddle is non-metallic.

18. The method of claim 17 in which the pipe saddle is formed from a polymeric material.

19. The method of claim 9 in which said vacuum-forming comprises attaching the production mold to a vacuum-forming bed, covering the production mold with a polymeric sheet, and drawing a vacuum on the space under the polymeric sheet to cause the sheet to conform to the production mold.

20. The method of claim 19 in which the formed pipe saddle is cut out from the polymeric sheet.

* * * * *